United States Patent
Nakauchi et al.

(10) Patent No.: US 11,888,295 B2
(45) Date of Patent: Jan. 30, 2024

(54) GAS INSULATED APPARATUS

(71) Applicant: Mitsubishi Electric Corporation, Tokyo (JP)

(72) Inventors: Shinichiro Nakauchi, Tokyo (JP); Manabu Yoshimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/281,672

(22) PCT Filed: Feb. 1, 2019

(86) PCT No.: PCT/JP2019/003702
§ 371 (c)(1),
(2) Date: Mar. 31, 2021

(87) PCT Pub. No.: WO2020/157975
PCT Pub. Date: Aug. 6, 2020

(65) Prior Publication Data
US 2022/0006271 A1    Jan. 6, 2022

(51) Int. Cl.
*H02B 13/045* (2006.01)
*H02G 5/06* (2006.01)
(Continued)

(52) U.S. Cl.
CPC ......... *H02B 13/055* (2013.01); *H02B 13/045* (2013.01); *H02B 13/065* (2013.01); *H02G 5/065* (2013.01)

(58) Field of Classification Search
CPC ........ H02G 5/06; H02G 5/065; H02B 13/045; H02B 13/065; H02B 13/035
See application file for complete search history.

(56) References Cited

U.S. PATENT DOCUMENTS 9,508,507 B2 * 11/2016 Yoshimura ............. H01H 33/24
9,812,235 B2 * 11/2017 Matsuzaki ........... C09D 163/00
(Continued)

FOREIGN PATENT DOCUMENTS

EP    3118956 A1    1/2017
EP    3163701 A1    5/2017
(Continued)

OTHER PUBLICATIONS

English translation of Fujita, Shinji et al., WIPO publication WO 2019/123889 A1 dated Jun. 6, 2019, translation downloaded from Espacenet on Jan. 14, 2023 (Year: 2023).*
(Continued)

*Primary Examiner* — Robert J Hoffberg
(74) *Attorney, Agent, or Firm* — BUCHANAN INGERSOLL & ROONEY PC

(57) ABSTRACT

A gas insulated apparatus includes: a grounded metal tank in which an insulating gas is enclosed; a conductor disposed in the tank, voltage being applied to the conductor; and a non-linear resistance layer disposed on at least part of an inner surface of the tank and made from an insulating material containing a particle of a non-linear resistance material, the non-linear resistance material being conductive when voltage higher than or equal to a threshold is applied. The non-linear resistance layer has a thickness that is larger than a sum of a thickness of a conductive portion and a particle diameter of the non-linear resistance material, the conductive portion being a portion of the non-linear resistance layer that is conductive when voltage higher than or equal to the threshold is applied to a metal foreign object on the non-linear resistance layer.

5 Claims, 3 Drawing Sheets

(51) Int. Cl.
*H02B 13/065* (2006.01)
*H02B 13/055* (2006.01)

(56) References Cited

U.S. PATENT DOCUMENTS

| | | | | |
|---|---|---|---|---|
| 9,890,296 | B2 * | 2/2018 | Matsuzaki | C08K 7/14 |
| 9,972,987 | B2 * | 5/2018 | Nakauchi | H02G 5/063 |
| 10,043,621 | B2 * | 8/2018 | Kainaga | H02G 5/065 |
| 10,069,285 | B2 * | 9/2018 | Kainaga | H02B 13/045 |
| 10,096,979 | B2 * | 10/2018 | Yoshimura | H02G 5/065 |
| 10,965,106 | B2 * | 3/2021 | Kawano | H02B 13/035 |
| 11,031,765 | B2 * | 6/2021 | Yoshimura | H01H 9/48 |
| 2015/0357801 | A1 * | 12/2015 | Nakauchi | H02G 5/065 |
| | | | | 361/618 |
| 2017/0194775 | A1 | 7/2017 | Kainaga et al. | |

FOREIGN PATENT DOCUMENTS

| | | | |
|---|---|---|---|
| EP | 2405550 B1 | 2/2018 | |
| JP | 2010207047 A | 9/2010 | |
| JP | 5065994 B2 * | 11/2012 | |
| JP | 5135263 B2 | 2/2013 | |
| WO | 2015198420 A1 | 12/2015 | |
| WO | 2017098553 A1 | 6/2017 | |
| WO | WO-2018012012 A1 * | 1/2018 | H01B 17/62 |
| WO | WO-2019123889 A1 * | 6/2019 | |

OTHER PUBLICATIONS

International Search Report (PCT/ISA/210) with translation and Written Opinion (PCT/ISA/237) dated May 14, 2019, by the Japan Patent Office as the International Searching Authority for International Application No. PCT/JP2019/003702.

Extended European Search Report dated Jan. 13, 2022, issued in corresponding European Patent Application No. 19913498.2, 9 pages.

Communication pursuant to Article 94(3) EPC dated Oct. 31, 2023, issued in the European Patent Application No. 19913498.2, 8 pages.

* cited by examiner

GAS INSULATED APPARATUS

FIELD

The present invention relates to a gas insulated apparatus in which a conductor is disposed in a metal tank in which an insulating gas is enclosed.

BACKGROUND

In gas insulated apparatuses in which a conductor is disposed in a metal tank in which an insulating gas is enclosed, metal foreign objects may enter the tank. For this reason, an insulating coating is applied to the tank inner surface to inhibit movement of charge from the tank inner surface to the metal foreign objects, thereby inhibiting the metal foreign objects from being charged.

When the applied voltage is increased in a state where a metal foreign object is present on an insulating film, a partial discharge occurs at the contact between the metal foreign object and the insulating film and the metal foreign object is thus charged. Consequently, the electrical attraction acting on the metal foreign object becomes larger than the weight of the metal foreign object, and thus the metal foreign object rises and floats, or levitates. The metal foreign object suspended in the tank radially shuttles in the tank under the influence of the electric field generated from the energized conductor, which may be a factor in causing a reduction in withstand voltage. Therefore, it is necessary to inhibit movement of the metal foreign object in the tank.

Patent Literature 1 discloses a technique of incorporating a non-linear resistance material into resin and causing current to flow in the non-linear resistance material to allow the charge resulting from the partial discharge to escape to the tank and thus inhibit the metal foreign object from levitating.

CITATION LIST

Patent Literature

Patent Literature 1: Japanese Patent Application Laid-open No. 2010-207047

SUMMARY

Technical Problem

With the technique disclosed in Patent Literature 1; however, the current flow path for allowing the charge resulting from the partial discharge to escape to the tank may also serve as a current flow path for supplying charge from the tank to the metal foreign object. Thus, this technique has only a limited effect in inhibiting levitation of the metal foreign object.

The present invention has been achieved in view of the above and an object of the present invention is to provide a gas insulated apparatus that inhibits a metal foreign object that has entered the tank from levitating from the tank inner surface.

Solution to Problem

In order to solve the above problems and achieve the object, an aspect of the present invention is a gas insulated apparatus including: a grounded metal tank in which an insulating gas is enclosed; a conductor disposed in the tank, voltage being applied to the conductor; and a non-linear resistance layer disposed on at least part of an inner surface of the tank and made from an insulating material containing a particle of a non-linear resistance material, the non-linear resistance material being conductive when voltage higher than or equal to a threshold is applied. The non-linear resistance layer has a thickness that is larger than a sum of a thickness of a conductive portion and a particle diameter of the non-linear resistance material, the conductive portion being a portion of the non-linear resistance layer that is conductive when voltage higher than or equal to the threshold is applied to a metal foreign object on the non-linear resistance layer.

Advantageous Effects of Invention

According to the present invention, an effect is obtained where it is possible to provide a gas insulated apparatus that inhibits a metal foreign object that has entered the tank from levitating from the tank inner surface.

DESCRIPTION OF EMBODIMENTS

A gas insulated apparatus according to embodiments of the present invention will be described below in detail with reference to the drawings. This invention is not limited to the embodiments.

First Embodiment

Figure 1:
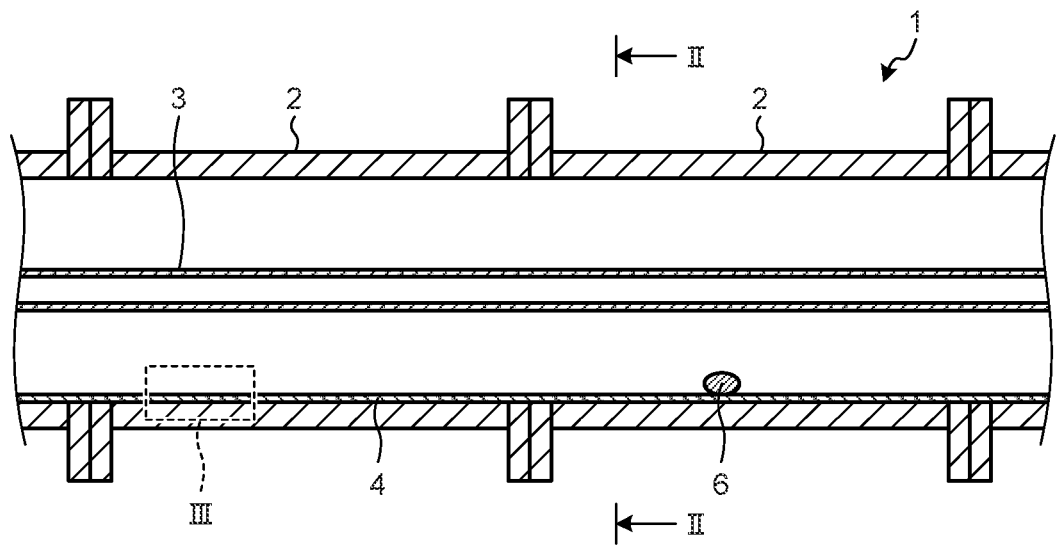
FIG. 1 is a longitudinal sectional view of the configuration of a gas insulated apparatus according to a first embodiment of the present invention.
Figure 2:
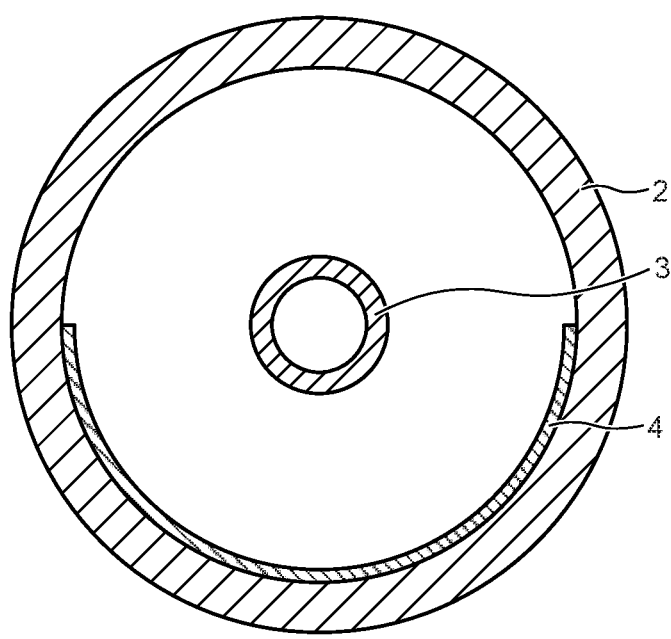
FIG. 2 is a transverse sectional view of the gas insulated apparatus according to the first embodiment.
Figure 3:
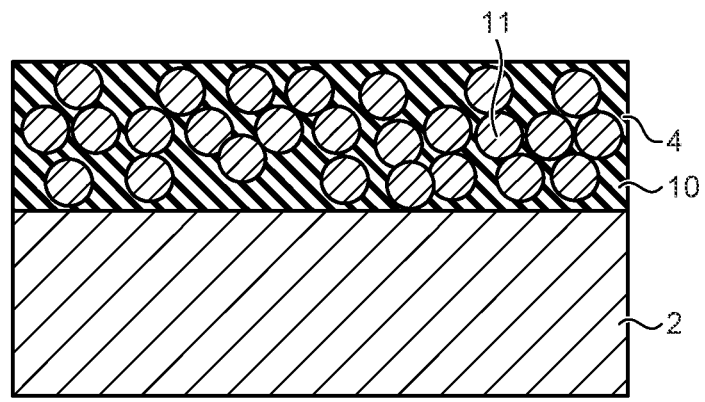
FIG. 3 is an enlarged view of a portion III in FIG. 1.

FIG. 1 is a longitudinal sectional view of the configuration of a gas insulated apparatus according to a first embodiment of the present invention. FIG. 2 is a transverse sectional view of the gas insulated apparatus according to the first embodiment. FIG. 2 illustrates a cross-section taken along line II-II in FIG. 1. FIG. 3 is an enlarged view of a portion III in FIG. 1. As illustrated in FIGS. 1 and 2, a gas insulated apparatus 1 according to the first embodiment includes a grounded metal tank 2, a conductor 3 that is disposed in the tank 2 and to which voltage is applied, and a non-linear resistance layer 4 disposed on the inner surface of the tank 2. FIG. 1 also illustrates a metal foreign object 6 present on the non-linear resistance layer 4. The gas insulated apparatus 1 is, for example, a circuit breaker, a disconnector, a bus, a current transformer, a voltage transformer, or a grounding switch. The tank 2 is disposed such that its axial direction is parallel to the surface on which the tank 2 is mounted. The tank 2 is filled with an insulating gas, such as sulfur hexafluoride. The conductor 3 extends in the axial direction of the tank 2. In the first embodiment, the conductor 3 has a hollow cylindrical shape but may have a solid cylindrical shape. The conductor 3 is supported by an insulating spacer (not illustrated).

The non-linear resistance layer 4 is made from an insulating material containing a non-linear resistance material. The non-linear resistance material is a material that exhibits a high value of resistance to a low electric field but exhibits a low value of resistance to a high electric field. The non-linear resistance material is also referred to as a non-linearity resistance material. In the first embodiment, the non-linear resistance material is zinc oxide. The insulating material is an epoxy resin.

Figure 4:
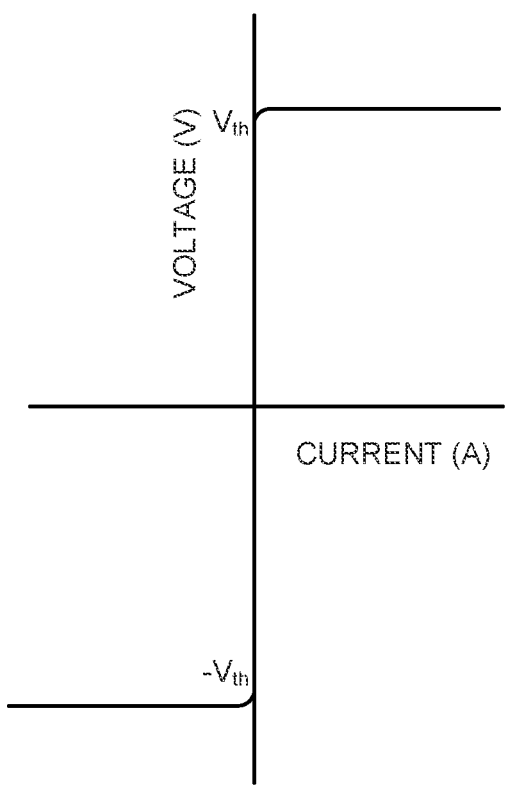
FIG. 4 is a diagram illustrating current-voltage characteristics of zinc oxide that is a non-linear resistance material of a non-linear resistance layer of the gas insulated apparatus according to the first embodiment.

FIG. 4 is a diagram illustrating current-voltage characteristics of zinc oxide that is the non-linear resistance material of the non-linear resistance layer of the gas insulated apparatus according to the first embodiment. In FIG. 4, the horizontal axis represents current (A) and the vertical axis represents voltage (V). Zinc oxide is insulating when the absolute value of the voltage is lower than a threshold $V_{th}$. However, when the absolute value of the voltage is higher than the threshold $V_{th}$, the resistance of zinc oxide decreases sharply and zinc oxide becomes conductive.

As illustrated in FIG. 3, in the non-linear resistance layer 4, an insulating resin 10 as the insulating material contains a plurality of zinc oxide particles 11. The particles 11 are zinc oxide in granular or powdered form.

Figure 5:
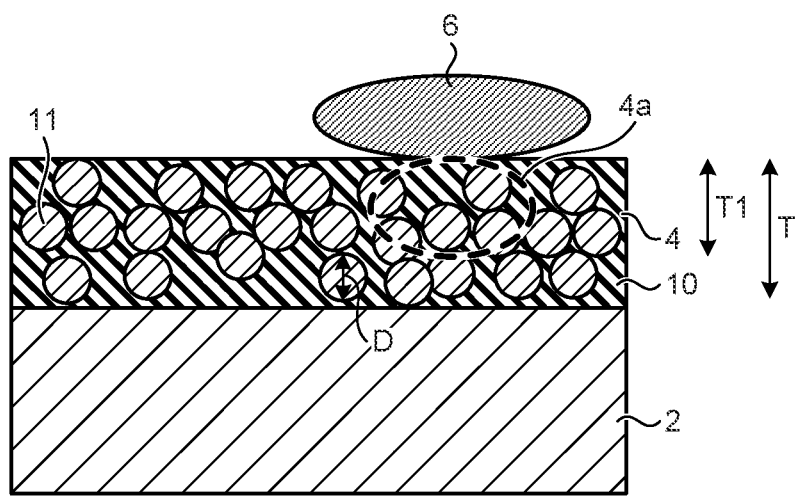
FIG. 5 is a diagram illustrating the function of the non-linear resistance layer of the gas insulated apparatus according to the first embodiment.

FIG. 5 is a diagram illustrating the function of the non-linear resistance layer of the gas insulated apparatus according to the first embodiment. When the metal foreign object 6 is present on the non-linear resistance layer 4, a high electric field is generated around a triple junction portion that is the contact between the metal foreign object 6, the non-linear resistance layer 4, and an insulating gas, i.e., a portion where the metal foreign object 6, the non-linear resistance layer 4, and an insulating gas contact with one another. Such a high electric field reduces the resistance of the non-linear resistance layer 4 immediately under the metal foreign object 6; therefore, the non-linear resistance layer 4 partially becomes a conductive portion 4a that is conductive. Formation of the conductive portion 4a in the non-linear resistance layer 4 immediately under the metal foreign object 6 diffuses charge of the metal foreign object 6 into the conductive portion 4a; therefore, the metal foreign object 6 can be inhibited from levitating from the non-linear resistance layer 4.

The non-linear resistance layer 4 has a thickness T that is larger than the sum of a thickness T1 of the conductive portion 4a and a particle diameter D of the particles 11. The conductive portion 4a is a portion of the non-linear resistance layer 4 immediately under the metal foreign object 6 and conductive under the influence of the high electric field generated when current flows in the conductor 3. Thus, even when a portion of the non-linear resistance layer 4 immediately under the metal foreign object 6 becomes the conductive portion 4a under the influence of the high electric field generated when current flows in the conductor 3, the non-linear resistance layer 4 still maintains electrical insulation in a portion of the thickness exceeding the particle diameter D of the particles 11.

The content of zinc oxide in the non-linear resistance layer 4 needs to be larger than or equal to the content with which the non-linear resistance layer 4 exhibits non-linear resistance characteristics. However, the non-linear resistance layer 4 with an excessively high content of zinc oxide is frangible. Thus, the content of zinc oxide is preferably in the range of 30% to 80% in volume fraction.

The non-linear resistance layer 4 is a coating film formed by coating. In this case, the non-linear resistance layer 4 is formed by mixing the zinc oxide particles 11 into insulating paint and applying the insulating paint containing the zinc oxide particles 11 to the inner surface of the tank 2. The coating film of the non-linear resistance layer 4 is formed by using various coating methods such as brushing, spray coating, and electrostatic coating.

In the gas insulated apparatus 1 according to the first embodiment, when the voltage applied to the conductor 3 is increased in a state where the metal foreign object 6 adheres to the non-linear resistance layer 4, a high electric field is generated and only a portion immediately under the metal foreign object 6 becomes the conductive portion 4a; therefore, a portion maintaining electrical insulation remains between the metal foreign object 6 and the tank 2. Thus, the metal foreign object 6 can be prevented from being charged, levitating, and then adhering to the conductor 3. The non-linear resistance layer 4 has a thickness T that is larger than the sum of the thickness T1 of the conductive portion 4a and the particle diameter D of the particles 11. The conductive portion 4a is a portion of the non-linear resistance layer 4 that is conductive under the influence of the high electric field. Therefore, electrical isolation can be ensured between the metal foreign object 6 and the tank 2.

Moreover, in the gas insulated apparatus 1 according to the first embodiment, it is sufficient if only the non-linear resistance layer 4 is provided on the inner surface of the tank 2 and it is not necessary to stack a plurality of films. In the gas insulated apparatus 1 according to the first embodiment, it is not necessary to wait for the coating film of the non-linear resistance layer 4 to be dried and then form another film, which facilitates manufacturing.

In the first embodiment, the non-linear resistance material is zinc oxide; however, zinc oxide is not a limitation and the non-linear resistance material may be, for example, silicon carbide.

The insulating material used for the non-linear resistance layer 4 is not limited to an epoxy resin. When the insulating material is a thermoplastic resin, examples of the insulating material include a vinyl chloride-based resin, a polyester-based resin, and a nylon-based resin. When the insulating material is a thermosetting resin, examples of the insulating material include an epoxy-based resin, a urethane-based resin, and an acrylic-based resin.

Moreover, the non-linear resistance layer 4 may be formed by using methods other than coating. For example, the non-linear resistance layer 4 may be an insulating sheet.

The non-linear resistance layer 4 is disposed on the lower half portion of the inner surface of the tank 2; however, this is not a limitation. The non-linear resistance layer 4 may be disposed in the range narrower than the range illustrated in FIG. 2. Alternatively, the non-linear resistance layer 4 may be disposed in the range wider than the range illustrated in FIG. 2. For example, the non-linear resistance layer 4 may be disposed over the whole surface of the tank 2. This means that it is sufficient if the non-linear resistance layer 4 is disposed on at least part of the inner surface of the tank 2.

The gas insulated apparatus 1 according to the first embodiment does not allow equipotential lines to enter between the metal foreign object 6 and the insulating portion of the non-linear resistance layer 4 at high density; therefore, concentration of equipotential lines is alleviated and thus the electric field in the triple junction portion is reduced. A portion of the non-linear resistance layer 4 maintaining electrical insulation is interposed between the metal foreign object 6 and the tank 2; therefore, charge can be inhibited from being supplied from the tank 2 to the metal foreign object 6.

The configurations described in the above-mentioned embodiments indicate examples of the content of the present invention. The configurations can be combined with another well-known technique, and the configurations can be partly omitted or changed in a range not departing from the gist of the present invention.

REFERENCE SIGNS LIST

1 gas insulated apparatus; 2 tank; 3 conductor; 4 non-linear resistance layer; 4*a* conductive portion; 6 metal foreign object; 10 insulating resin; 11 particle.

The invention claimed is:

1. A gas insulated apparatus comprising:
a grounded metal tank in which an insulating gas is enclosed;
a conductor disposed in the grounded metal tank, a voltage being applied to the conductor; and
a non-linear resistance layer disposed on at least part of an inner surface of the grounded metal tank and made from an insulating material containing a plurality of particles of a single non-linear resistance material, the insulating material being a single material arranged in a single layer, the non-linear resistance layer comprises:
a first portion immediately under a metal foreign object and containing an entirety of at least one of the particles, the first portion configured to become a conductive portion when a voltage higher than or equal to a threshold is applied to the metal foreign object, the metal foreign object contacting the insulating material,
a second portion, formed between the grounded metal tank and the first portion of the non-linear resistance layer and under the metal foreign object, the second portion contains an entirety of at least another one of the particles, the second portion configured to maintain insulation when the voltage higher than or equal to the threshold is applied to the metal foreign object,
wherein the non-linear resistance layer has a total thickness that is larger than a sum of a thickness of the conductive portion of the first portion of the non-linear resistance layer and a diameter of the at least another one of the particles in the second portion of the non-linear resistance layer, and
wherein the plurality of particles of the single non-linear resistance material directly contact the insulating material and the plurality of particles of the single non-linear resistance material are distributed in the insulating material, and there is no contact between the plurality of particles of the single non-linear resistance material and the metal foreign object.

2. The gas insulated apparatus according to claim 1, wherein the non-linear resistance layer is a coating film.

3. The gas insulated apparatus according to claim 2, wherein the single non-linear resistance material is zinc oxide or silicon carbide.

4. The gas insulated apparatus according to claim 1, wherein the single non-linear resistance material is zinc oxide or silicon carbide.

5. The gas insulated apparatus according to claim 1, wherein each of the plurality of particles of the single non-linear resistance material has a particle size D.

* * * * *